UNITED STATES PATENT OFFICE.

KARL SCHIRMACHER, OF HÖCHST-ON-THE-MAIN, AND RICHARD LEOPOLD, OF HOCH-HEIM-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

BLUISH-RED AZO DYESTUFF.

1,001,458.     Specification of Letters Patent.     Patented Aug. 22, 1911.

No Drawing.     Application filed October 10, 1910. Serial No. 586,386.

*To all whom it may concern:*

Be it known that we, KARL SCHIRMACHER, Ph. D., chemist, and RICHARD LEOPOLD, Ph. D., chemist, citizens of the Empire of Germany, residing at Höchst-on-the-Main, and Hochheim-on-the-Main, Germany, respectively, have invented certain new and useful Improvements in Bluish-Red Azo Dyestuff, of which the following is a specification.

We have found that by combining the diazo compound of 5-nitro-2-amino-1-benzyl-sulfonic acid $C_6H_3(NO_2)(NH_2)CH_2SO_3H$ with 2:3-oxynaphthoic acid, a bluish-red azo dyestuff is obtained which is very valuable for the preparation of color lakes. This dyestuff surpasses the analogous dyestuff, obtained from the corresponding nitranilinsulfonic acid, by its fastness to light.

The formula of the new dyestuff is as follows:

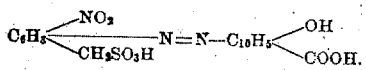

The following example illustrates the invention: 25.4 parts by weight of sodium 5-nitro-2-amino-1-benzylsulfonate are diazotized by means of 6.9 parts of sodium nitrite and 30 parts of hydrochloric acid of 20° Baumé specific gravity and the mass is introduced while stirring into a solution of 23.5 parts of di-sodium 2:3-oxynaphthoate and 20 parts of sodium carbonate. The combination occurs within a short time. The mass is then gently heated and filtered. When dry the dyestuff forms a red powder, difficulty soluble in water and insoluble in alcohol. It dissolves in concentrated sulfuric acid to a bluish-red solution. The calcium salts and barium salts of the dyestuff are insoluble in water.

Having now described our invention what we claim is:

As a new product, the azo dyestuff obtainable by combining diazotized 5-nitro-2-amino-1-benzyl-sulfonic acid with 2.3-oxynaphthoic acid, which is split into diamino-benzylsulfonic acid and aminooxynaphthoic acid, being a bluish-red powder, difficultly soluble in water, insoluble in alcohol, soluble in concentrated sulfuric acid to a bluish-red solution and forming insoluble calcium salts and barium salts.

In testimony whereof, we affix our signatures in presence of two witnesses.

KARL SCHIRMACHER.
RICHARD LEOPOLD.

Witnesses:
JEAN GRUND,
CARL GRUND.